United States Patent

[11] 3,586,139

| [72] | Inventors | Peter D. Ruffalo<br>Kenosha;<br>Jerald D. Hinke, Rancine, both, Wis. |
|---|---|---|
| [21] | Appl. No. | 817,425 |
| [22] | Filed | Apr. 18, 1969 |
| [45] | Patented | June 22, 1971 |
| [73] | Assignee | J. I. Case Company |

[54] SELF-ADJUSTING BRAKE MECHANISM
14 Claims, 5 Drawing Figs.

[52] U.S. Cl. ............................................. 188/196,
188/71.9
[51] Int. Cl. ..................................................F16d 65/56,
F16d 55/14
[50] Field of Search............................................ 188/71.8,
71.09, 196 RR

[56] References Cited
UNITED STATES PATENTS

| 3,111,18 | 11/1963 | Hodkinson | 188/71.9 |
| 3,129,789 | 4/1964 | Hodkinson | 188/71.9 |
| 3,392,805 | 7/1968 | Kreitner | 188/71.9 X |

Primary Examiner—Duane A. Reger
Attorney—Dressler, Goldsmith, Clement & Gordon

ABSTRACT: An automatic adjuster for adjusting the running clearance between brake elements which are actuated by a pivoted arm operatively connected to one of the brake elements by a rod. The adjuster includes a bellcrank pivoted on the arm and carrying an actuator element having a free end in engagement with ratchet teeth on a nut threaded onto the rod with the nut frictionally engaging the arm. A tension spring pivots the bellcrank when the frictional forces between the nut and arm are below a predetermined level to rotate the nut thereby adjusting the running clearance. The adjuster further includes a return bar engaging the bellcrank to return the bellcrank to its normal position upon return of the pivoted arm to its normal inoperative position.

Inventors:
Peter D. Ruffalo
Jerald D. Hinke
By:
Dressler, Goldsmith, Clement & Gordon
Attys.

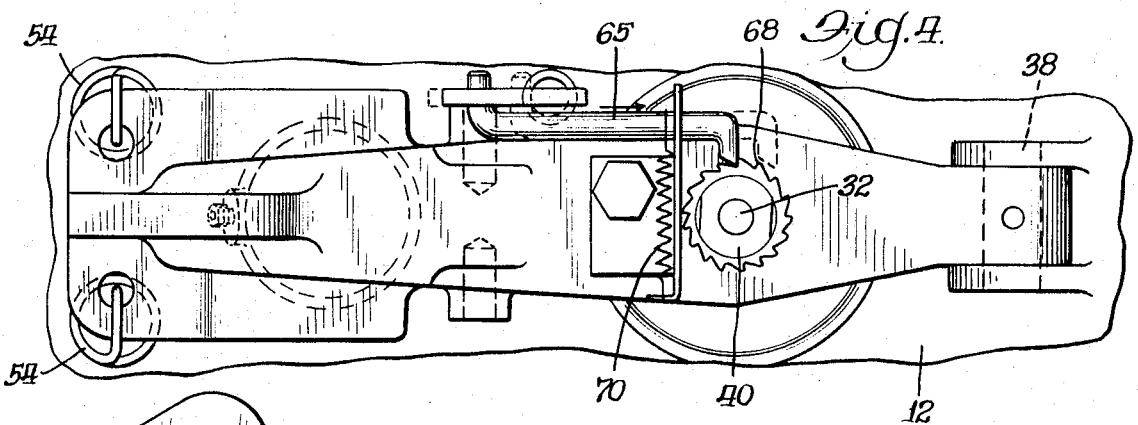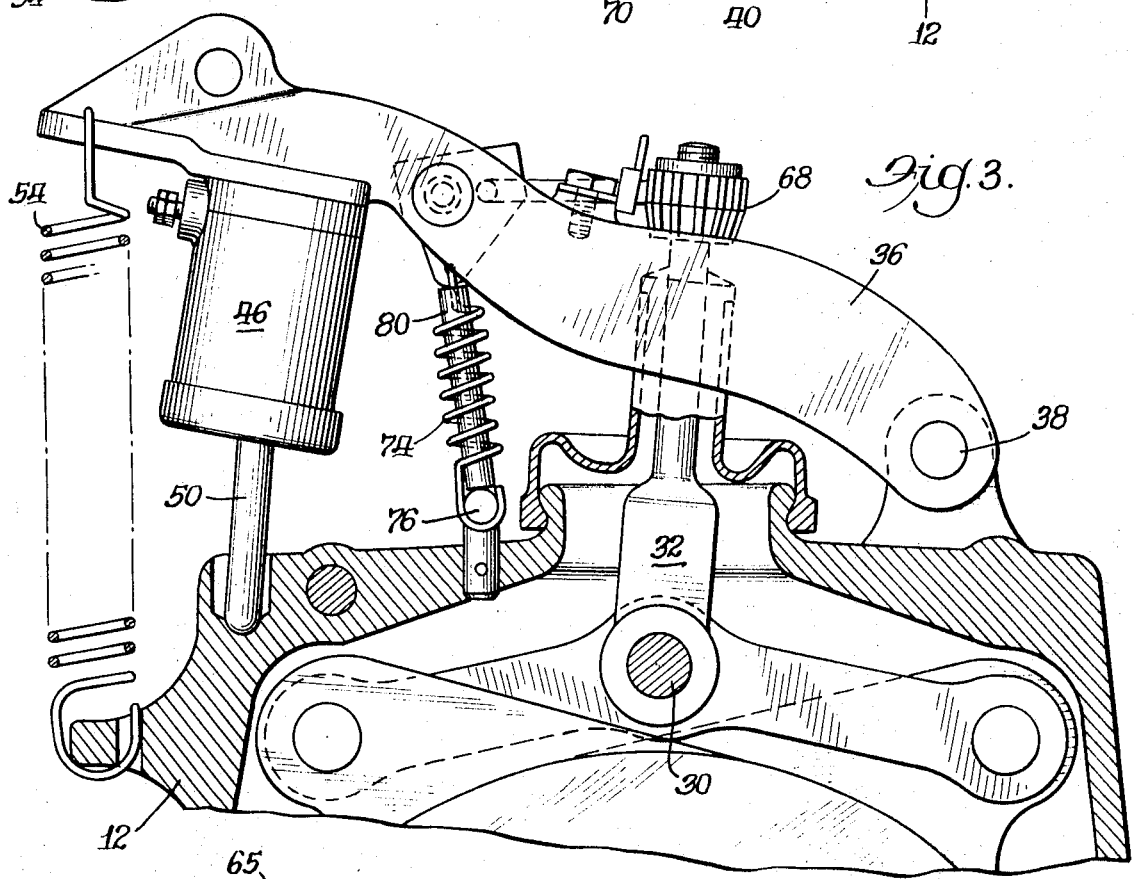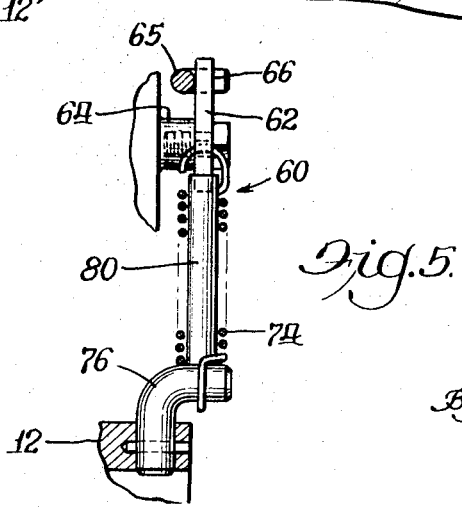

SELF-ADJUSTING BRAKE MECHANISM

BACKGROUND OF THE INVENTION

The present invention relates generally to braking mechanisms and more particularly to an automatic adjusting mechanism for adjusting the release position of a braking element.

Self-adjusting mechanisms for maintaining a preestablished clearance between relatively moving braking elements of a brake assembly have been known for years and examples of such devices are disclosed in Helvern U.S. Pat. No. 2,804,177 and Hahn, U.S. Pat. No. 2,874,807. While many such mechanisms have been proposed, there has still remained a need for a simple and effective mechanism for automatically adjusting the running clearance between braking elements.

SUMMARY OF THE INVENTION

The present invention contemplates an improved type of self-adjusting mechanism particularly adapted for a brake assembly of the type disclosed in the above-mentioned Hahn patent. According to the invention, the actuating mechanism for a brake assembly includes a movable arm operatively connected to the movable braking element by a rod threaded at its free end and receiving an adjustable nut which frictionally engages the movable member. The position of the nut on the rod determines the clearance between the braking elements in the release position.

The self-adjusting mechanism also includes a bellcrank pivoted to the movable member and having an actuator rod carried thereon which has a free end in engagement with ratchet teeth formed on the nut. The bellcrank is normally maintained in a normal position by the frictional forces between the nut and the member. The bellcrank is capable of being moved from the first or normal position, when the frictional forces drop below a predetermined level, by a tension spring connected to one corner of the bellcrank and having its opposite end connected to a support structure. The mechanism further includes an element for automatically returning the bellcrank to the normal position upon return of the actuating member to its inoperative position.

Thus, the primary object of the present invention is to provide a simple and effective adjusting mechanism for automatically maintaining a predetermined clearance between braking elements of a braking assembly.

Another object is to provide a self-adjusting mechanism which can be incorporated into most of the commercially available brake assemblies with a minimum of effort and expenditure.

Other objects of the invention will become apparent upon consideration of the following detailed description when taken in connection with the accompanying drawings.

BRIEF DESCRIPTION OF DRAWINGS

FIG. 3 is a view similar to FIG. 2 showing the brake assembly in the actuated position;

FIG. 4 is a plan view of the brake assembly shown in FIG. 1; and

FIG. 5 is a fragmentary end view showing the self-adjusting mechanism of the present invention.

DETAILED DESCRIPTION

Figure 1:
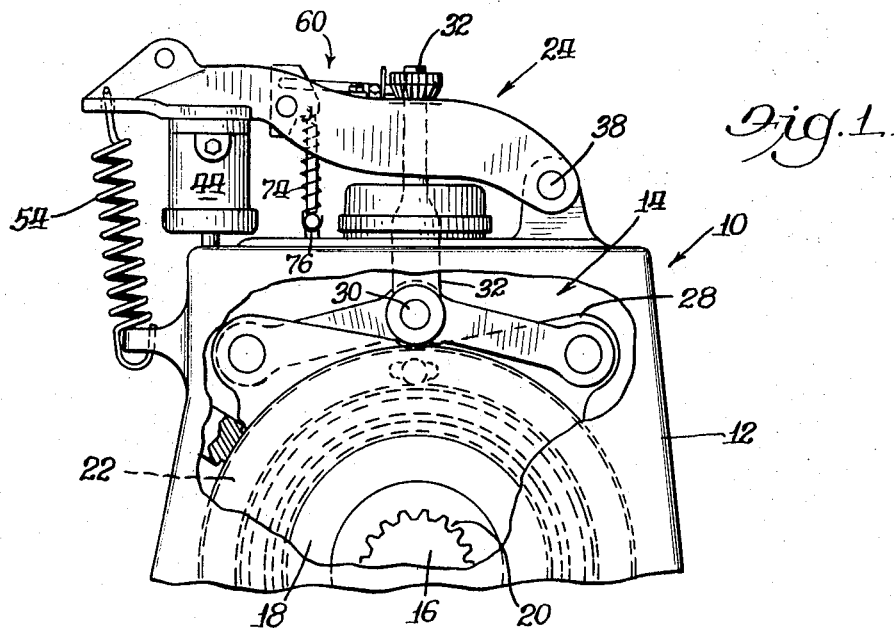
FIG. 1 is a side elevation view of a braking assembly having the present invention incorporated therein, with parts thereof broken away for clarity.

FIG. 1 of the drawings discloses generally a braking assembly 10 of the type disclosed in the above mentioned Hahn patent. The assembly 10 includes a housing or casing 12 having a recess 14 therein in which the braking elements are contained. The housing 12 is adapted to be fixedly secured to a support member of a vehicle (not shown) with a driven shaft 16, such as the drive axle of the vehicle extending into the housing. The brake assembly is thus capable of braking the shaft 16 to affect braking of the wheels supported on the shaft.

The braking assembly also includes a pair of friction surfaces (not shown) defined on the inner opposed axially spaced surfaces of the housing 12. A pair of annular friction discs or brake elements 18 are secured to the shaft 16 by a spline 20 for rotation therewith and for axial shifting movements thereon. Disposed between the axially movable brake elements 18 is an actuator element which includes a pair of discs 22 which are axially shiftable by an actuator mechanism 24 to cause engagement of the fixed braking element and the relatively movable braking elements.

Since all of these elements are substantially identical to those disclosed in U.S. Pat. No. 2,874,807 and are commercially available, no detailed description thereof appears to be necessary. For purposes of completeness, the above patent is incorporated herein by reference.

The actuating mechanism 24 includes a pair of links 26 each having one end pivotally connected to lugs 28 carried by the respective braking elements which may be considered to include the actuator members 22 as well as the axially movable friction discs 18. The opposite ends of the links 26 are pivotally connected by a common pin 30 to one end of a member or rod 32. The opposite free end of the rod has a threaded portion which extends through an opening 34 defined on a lever or member 36 which is pivoted by a pin 38 on the support housing 12. The threaded portion of the rod receives a nut 40 which operatively connects the brake element to the arm or lever 36.

The actuating mechanism further includes a one-way fluid motor 44 comprising a cylinder 46 fixedly secured to the free end of the arm 36 and having a piston 48 slideably disposed therein. The piston 48 is adapted to move a piston rod 50 having one free end in engagement with the support housing 12. The fluid motor 44 is of the one-way type and receives pressured fluid through port 52 to cause an upward movement of the arm 36 thereby rotating the actuating members 22 relative to each other to cause engagement of the friction discs 18 forming the braking element. Tension springs 54 are connected to the free end of the arm 36 and the housing 12 to move the arm to the position shown in FIG. 2 upon release of the pressure on the fluid in the cylinder 46.

In present day commercial braking systems of this type, it is highly desirable to maintain the running clearance between the friction elements at a very minimum so that a minimum amount of brake pedal movement will cause an actuation of the brake assembly. Also, as was indicated above, it is highly desirable to continually readjust the spacing between the brake elements in the released position as the friction elements are subjected to wear during normal use.

According to the present invention, this is accomplished by mechanism for rotating the nut 40 when the clearance between the friction elements exceeds a predetermined value. The automatic brake adjuster 60 includes a movable member or freely pivoted bellcrank 62 pivoted about a pivot axis defined by shoulder bolt 64 fixedly secured to the arm or lever 36. The bellcrank has a rod or actuating member 65 having opposite ends with one end pivotally connected at 66 to the bellcrank at a point spaced from the pivot axis 64. The opposite end of the rod is held in engagement with ratchet teeth 68 defined on the nut 40 by spring 70.

The automatic brake adjuster or mechanism further includes a tension spring 74 having one end secured to the housing through a pin 76 and the opposite end thereof connected to bellcrank 62 at a connection point 78 which is spaced from the pivot axis 64. Also, the mechanism includes a rod or return means 80 having one end in engagement with pin 76 and an opposite end in engagement with a camming surface 82 defined upon the bellcrank 62.

OPERATION

Figure 2:
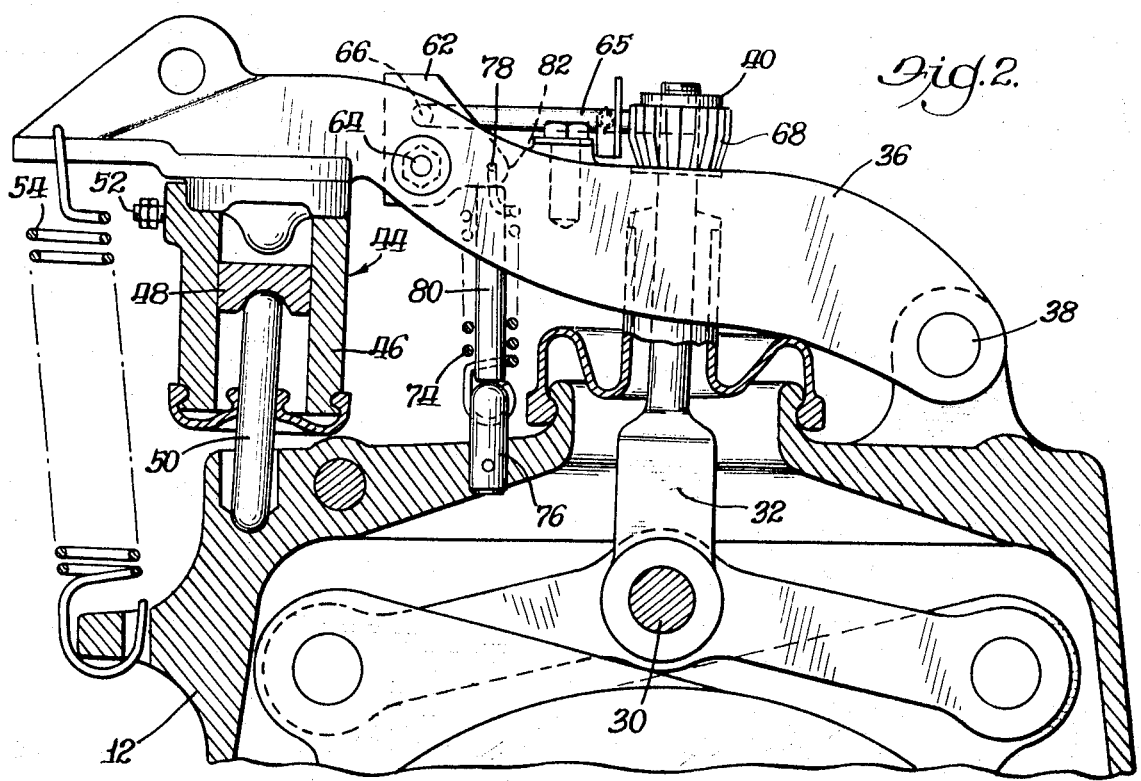
FIG. 2 is an enlarged fragmentary vertical sectional view of the brake assembly shown in FIG. 1 and showing the assembly in the released position.

During normal operation of the brake assembly, the actuating mechanism 24 is moved from the released position shown in FIG. 2 to the engaged position shown in FIG. 3 by an actuating mechanism which supplies pressured fluid to the port 52 thereby sliding the piston 48 in cylinder 46 to cause an upward movement of the arm or lever 36. This causes an upward movement of the pivot pin 30 to cause relative rotational movement of the actuating elements or braking elements 22.

During this upward movement, a predetermined frictional force is encountered between the lower surface of the nut 40 and the cooperating surface of the arm 36. Assuming that the clearance between the friction discs is greater than that desired, the frictional force or torque between the nut 40 and the arm 36 will be below a predetermined level during the first portion of the upward movement of the arm 36 about pivot pin 38. If this condition is present, the tension spring 74, which has a spring force substantially equal to the desired frictional forces to be maintained between the nut 40 and the arm 36, will cause a pivotal movement of the bellcrank about pivot axis 64 thereby causing an axial shifting of the rod 64 to rotate the nut 40 clockwise as viewed in FIG. 4. It will be appreciated that a clockwise rotation of the nut 40 will cause an upward shifting of the rod or member 32 to thereby reduce the clearance between the relatively movable friction elements.

Upon return of the arm 38 from the position shown in FIG. 3 to that shown in FIG. 2 the return rod 80 will cause a counterclockwise pivotal movement of the bellcrank 62 about the pivot axis 64 thereby returning the bellcrank to the position shown in FIG. 2. During this return movement, the free end of the rod 64 will slide along the camming surface of ratchet teeth 68 so as to be in position for subsequent movement from the solid-line position shown in FIG. 4 to the dotted line position thereof for a subsequent further adjustment of the threaded nut or adjustable element 40.

What we claim is:

1. In a brake adjuster for use with a brake having a first fixed element and at least one second element movable between released and engaged positions with actuating mechanism to move said second element between said positions, said actuating mechanism including a rod operatively connected to said second element, a lever cooperating with said rod and means for moving said rod, the improvement of threaded means received on said rod frictionally engaging said lever during movement thereof to define a torque load, and means for rotating said threaded means on said rod when said torque load falls below a predetermined level during movement of said lever whereby to adjust the release position of said second element, said last means being maintained in a first position when said torque load exceeds said predetermined level.

2. A brake adjuster as defined in claim 1, including the further improvement of said last means comprising a pivot member carried by said actuating mechanism.

3. A brake adjuster as defined in claim 2, in which said last means further includes tensioning means cooperating with said pivot member for (1) pivoting said pivot member from a normal position when said torque load falls below said predetermined level, and (2) yielding to maintain said pivot member in the normal position when said torque load exceeds said predetermined level.

4. A brake adjuster as defined in claim 3, in which said last means further includes mechanism for returning said pivot member to the normal position during movement of said second element from the engaged to the released position.

5. A brake adjuster as defined in claim 2, including the further improvement of said last means including a tension spring connected to and pivoting said pivot member during movement of said lever to engage said second element when said torque load is below said predetermined level, and a bar engaging said pivot member for returning said pivot member to a normal position when said lever is returned to a normal position.

6. A brake adjuster as defined in claim 2, and wherein said threaded means comprises a nut having ratchet teeth formed on the peripheral surface thereof, and wherein said last means includes a rod having one end connected to said pivot member and means maintaining an opposite end of said rod in engagement with said ratchet teeth.

7. A brake mechanism as defined in claim 1, in which said last means comprises a movable member carried by said lever and having a portion engageable with said threaded means and means for moving said movable member during operation of said actuating mechanism and when said torque load is below said predetermined level.

8. A brake mechanism as defined in claim 1, in which said last means includes a rod having one end in engagement with said threaded means and means for axially shifting said rod when the torque load is below said predetermined level and during operation of said actuating mechanism to rotate said threaded means.

9. In a brake actuator for use with a brake assembly having a fixed brake plate and a movable brake plate and including a first member pivoted on said assembly, drive means pivoting said first member, a second member cooperating with said first member and said movable brake plate to shift said movable brake plate, the improvement of an adjustable element carried by one of said members and frictionally engaging the other of said members during movement of said movable brake plate to define a frictional force maintaining said adjustable element in adjusted position, and mechanism for moving said adjustable element when said frictional force is below a predetermined level to vary the the relative position of said members, said mechanism being maintained in a first position when the frictional force exceeds said predetermined level.

10. A brake actuator as defined in claim 9, in which said mechanism includes a bellcrank pivoted on one of said members and means carried by the bellcrank engaging said adjustable element.

11. A brake actuator as defined in claim 10, in which said mechanism further includes biasing means connected to said bell crank for pivoting said bellcrank when the frictional force falls below the predetermined level and means engaging said bellcrank for returning said bellcrank from a pivoted to said first position.

12. A brake actuator as defined in claim 9, in which said mechanism includes a bellcrank pivoted about a pivot axis on said first member, a tension spring having a connection to said bellcrank at a point spaced from said axis, and an actuating member connected to said bellcrank at a point spaced from said axis and said connection, said actuating member engaging said adjustable element and said tension spring pivoting said bellcrank to shift said adjustable element during movement of said first member.

13. In combination with a brake having a housing, first and second relatively movable elements in said housing, and an actuator including a rod connected to one of said elements, an arm pivoted on said housing, a nut threaded on said rod and engaging said arm, and fluid motor means and spring means for pivoting said arm to move said one of said elements, a self-adjusting mechanism for adjusting running clearance between said elements comprising, an axially shiftable member having one end in engagement with said nut, means on said nut defining teeth engaged by said member, and means cooperating with said arm and said housing for axially shifting said member in response to pivoting of said arm whereby to rotate said nut and change the relative position of said rod and arm.

14. The combination as defined in claim 13, in which said last means includes a plate pivoted on said arm about a pivot axis with an opposite end of said member connected to said plate at a point spaced from said pivot axis, a spring connected to said plate for moving said plate between first and second positions during pivotal movement of said arm in one direction and return means between said plate and said housing for moving said plate from the second to the first position during pivotal movement of said arm in an opposite direction.

PO-1050
(5/69)

UNITED STATES PATENT OFFICE
CERTIFICATE OF CORRECTION

Patent No. 3,586,139          Dated June 22, 1971

Inventor(s) Peter D. Ruffalo and Jerald D. Hinke

It is certified that error appears in the above-identified patent and that said Letters Patent are hereby corrected as shown below:

In the References Cited change "3,111,18" to -- 3,111,198 --.

Column 3, line 34 change "solid-line" to -- solid line --.

Signed and sealed this 4th day of January 1972.

(SEAL)
Attest:

EDWARD M. FLETCHER, JR.          ROBERT GOTTSCHALK
Attesting Officer          Acting Commissioner of Patents